Feb. 22, 1966  S. W. BRESENOFF ETAL  3,237,107
ELECTRONIC GAIN-SCHEDULING APPARATUS
Filed April 26, 1962  3 Sheets-Sheet 1

INVENTOR.
STANLEY W. BRESENOFF
FREDERICK H. GARDNER
BY

ATTORNEY

INVENTOR.
STANLEY W. BRESENOFF
FREDERICK H. GARDNER
BY

ATTORNEY

INVENTORS
STANLEY W. BRESENOFF
FREDERICK H. GARDNER
BY Roy M Pitts
ATTORNEY

United States Patent Office 3,237,107
Patented Feb. 22, 1966

3,237,107
ELECTRONIC GAIN-SCHEDULING APPARATUS
Stanley W. Bresenoff, Garden Grove, and Frederick H. Gardner, Long Beach, Calif., assignors to North American Aviation, Inc.
Filed Apr. 26, 1962, Ser. No. 190,408
6 Claims. (Cl. 328—1)

This invention relates to electronic gain scheduling apparatus, and more particularly to highly-reliable feedback means including a parameter-sensing transducer for controlling the gain of an amplifier as a function of a sensed parameter.

In maintaining control over a controlled vehicle such as an airplane or other element to be controlled, it is frequently desired to effect a predetermined response of such controlled element to a specific forcing function or parameter such as pressure-altitude, or to control a particular parameter of such response such as the pitching moment response of an aircraft to a pilot input. To effectively control a specific response parameter as a function of a second mutually distinct parameter requires that (1) a cooperative relationship exist between them by means of the controlled element and (2) means for sensing such parameters be available in the art for exciting, or otherwise enabling a control system to control, the response of such controlled vehicle. In other words, in order to expressly control a parameter, it is first necessary to be able to measure that parameter. Frequently, however, a control problem must be solved without express measurement of a relevant parameter. Such a situation may arise, for example, where the parameter sought to be measured cannot conveniently or reliably be sensed specifically by means known in the art. A second example would exist where the economies of price competition preclude the use of highly accurate but expensive and bulky equipment for expressly sensing a given parameter. In either of such cases, a technique of implicit sensing or implicit control of a given parameter may be employed.

One example of the technique of implicit sensing is the sensing of pressure by means of aneroid devices, employing the relation between the pressure of a "standard" atmosphere and altitude to provide an indication of pressure altitude. The relationship between such pressure-altitude and atmospheric pressure is non-linear, pressure altitude changing inversely to a change in atmospheric pressure. Hence, such aneroid altimeters usually employ a non-linear linkage arrangement between a sensing element thereof and an associated read-out element, or non-linear output element such as a non-linear pickoff or non-linear dial indicator.

Application of the technique of implicit control is to be found in the field of aircraft flight controls, wherein the static gain of an aircraft varies as a function of airspeed and pressure altitude. For example, the steady-state pitching moment or pitching acceleration $\ddot{\theta}$ induced upon the aircraft by a given incremental deflection $\delta_e$ of the control surfaces from a trim position is a function of airspeed and pressure altitude. Associated with this change in vehicle gain $$\left(\frac{\ddot{\theta}}{\delta_e}s.s\right)$$

is a change in the hinge moment or control surface load suffered by the servo actuator associated with such control surface.

For the closed-loop flight control system of a given aircraft, the open-loop gain or product of the vehicle gain and flight controller gain must be maintained within a given tolerance, over the envelope of the vehicle flight regimes (attainable combinations of speed and altitude). The upper limit of such gain combination is normally determined by dynamic stability considerations of the vehicle short period modes of motion, while the lower limit of such gain combination is normally determined from the desired closed-loop minimum speed of response. Therefore, as the gain of the aircraft varies as a function of flight condition, it is required to vary the gain of the flight controller in a somewhat inverse relation thereto in order to preserve the desired system gain.

Several devices have been employed in the prior art to provide means for achieving a more nearly constant aircraft gain over a flight envelope or wide combinations of airspeed and pressure altitude. One of these, for example, has been the use (in a flight controller) of a torque-servo in cooperation with a control surface, by which the motion of the control surface and actuator combination in response to a flight controller signal is a function of hinge-moment. Since the hinge-moment is a function of flight condition (e.g., a function of $\tfrac{1}{2}\varphi V^2$, where $\varphi$=air density at a given altitude and $V$=airspeed of the aircraft) and control surface deflection angle $\delta$, it is to be appreciated the resulting surface deflection for a given controller signal will be greater at higher altitudes (lower air density, $\varphi$) and slower airspeeds $V$, than at lower altitudes or higher airspeeds. In this way, the low gain or minimum steady-state response of the airplane to a given surface deflection $\delta$ at low values of $\tfrac{1}{2}\varphi V^2$ are compensated for in a closed-loop flight controller gain by increased control surface deflections for a given control signal, whereby it would appear possible to equalize the system gain over a wide range of flight conditions. In other words, a more nearly constant steady-state pitching moment results for a given control signal.

Such an approach, using a so-called torque servo, is of limited utility, however, for the reason that such a device does not display the high speed of response required for dynamic stability of the closed-loop flight controller. A torque-servo is a closed-loop positional servo having a low enough gain that the position response of the servo is necessarily sensitive to the torque load at the position output of the device. Such sensitivity, while providing the desired static-gain characteristics of the positional response of the servo, can only be practically obtained over a nominal range of torque or load conditions. Further, such torque sensitivity, relied upon to obtain the desired steady-state positional response, necessarily adversely affects the dynamic positional response of such a servo, thereby tending to decrease the damping and stability of a flight controller system employing such device, particularly under high hinge-moment flight conditions.

One means employed in the art to achieve a simplified inexpensive mechanization for gain scheduling as a function of air data has been the use of a non-linearly wound potentiometer pick-off element directly mounted on or mechanically coupled to an air pressure sensing element such as a bellows or diaphragm type pressure transducer. However, a disadvantage of such a device is that such potentiometers are not as reliable as other types of pick-offs (such A.-C. capacitive type or A.-C. inductive type pickoffs) in that the force of the spring-loaded potentiometer wiper upon the resistive element causes friction which often results in malfunction or inoperativeness of the device. Also, because of the wire-to-wire resolution effect of a wire-wound potentiometer, there is a limit to the resolution obtainable from a non-linearly wound potentiometer or like function generator. Also, use in a vibration-subject environment may cause "chattering" of the wiper arm against the resistive element, resulting in erratic and noisy signals. Further, such friction produced by spring-loading of the potentiometer wiper arm limits the threshold or lowest value of pressure (or other force-producing parameter) that may be measured, while reducing the spring-load reduces the quality of the electrical contact between the wiper element and the resistive element and increases the susceptibility to "chattering." Also, because of the inherent friction in driving each potentiometer, it is not feasible to provide several desired gain scheduling functions by ganging several non-linear potentiometers to a single sensor.

Other means of achieving flight controller gain scheduling as a function of air data have included air data computers employing force-rebalance type air data (static pressure and/or dynamic pressure) sensors employing high-resolution A.-C. pick-offs, for exciting servo-driven function generators or non-linear potentiometers. In this way, all of the necessary gain scheduling of the static gain elements and dynamic time-constant elements of a flight controller or the ballistic computer in a rocket armament system is provided for as a function of air data conditions, by means of a minimum number of sensors. Such air data computers can be designed to provide high degrees of accuracy, but are costly and complex to manufacture. Further, such complexity makes the devices less reliable than desired, in that the frequency of failures is high (e.g., the mean time between failures is low). Such unreliability is accounted for in large measure by the number of rotating and mechanical moving parts employed, since moving parts have been demonstrated to be less reliable generally than non-moving functional elements. Such high degrees of accuracy are not required in every application made of such devices, as to warrant the complexity and lack of reliability attendant in the use of such devices. Further, the servo driven non-linear function potentiometers, while not loading down the sensing element, yet display the limited resolution characteristic of a potentiometer. Accordingly, it is a broad object of the subject invention to provide less complex, and more reliable means for achieving gain scheduling as a function of air data or other sensed parameters.

In accordance with a preferred embodiment of the concept of the invention, there is provided a closed loop device for scheduling the gain of an electrical circuit as an inverse function of a sensed parameter comprising an amplifier in closed loop arrangement with a parameter-sensing transducer for processing an electrical input signal. The transducer is comprised of a high-resolution A.-C. pick-off element in a bridge circuit arrangement for providing an output indicative of the product of sensed parameter and an excitation voltage applied to bridge circuit. There is also provided signal comparison means responsive to an input signal and to the output from the transducer for obtaining a signal indicative of the difference between such signals. The closed-loop arrangement is achieved by responsively connecting the input of the amplifier to the signal comparison means, and by connecting the output of the amplifier to excite the bridge circuit of the transducer.

By means of the above described arrangement, the ratio of an output signal from the amplifier to an input (applied to the signal comparison means) is made to vary as an inverse function of the parameter sensed by the transducer. The precise nature of the relationship can be adjusted by adjusting the signal gain of the amplifier relative to the gain of the transducer. Further, by combining several such devices in various combinations using several simple direct-coupled transducers of mutually distinct parameters, the gain or ratio of an output signal to an input signal may be programmed as a predetermined function of a number of sensed parameters without requiring expensive force-rebalance type sensors and complex computing elements. For example, interposing a second such device in the feedback path of a first such device, would provide means for controlling the gain of a signal as a function of the ratio of two sensed parameters. Such an arrangement would include operatively connecting the output of the transducer of the first device to the input of the second device, and responsively connecting an input of the comparison means of the first device to the output of the second device.

Hence, it is to be appreciated that the concept of the invention provides highly reliable means for gain scheduling, employing a minimum number of moving parts.

Accordingly, it is an object of the subject invention to provide improved closed-loop means for varying the gain of an electrical signal as a function of a sensed parameter.

It is another object of the subject invention to provide highly reliable gain-scheduling means for scheduling the gain of an electrical signal as a function of a sensed parameter, employing a minimum number of mechanically-moving parts.

It is still another object of the subject invention to provide relatively inexpensive closed-loop means for scheduling the gain of an electrical signal as a function of a sensed parameter to within fine limits of resolution.

It is a further object of the subject invention to provide means for generating a signal indicative of the ratio of two sensed parameters.

These and other objects of the invention will become apparent from the following description taken together with the following drawings in which.

In the figures, like reference elements refer to like parts.

Figure 1:
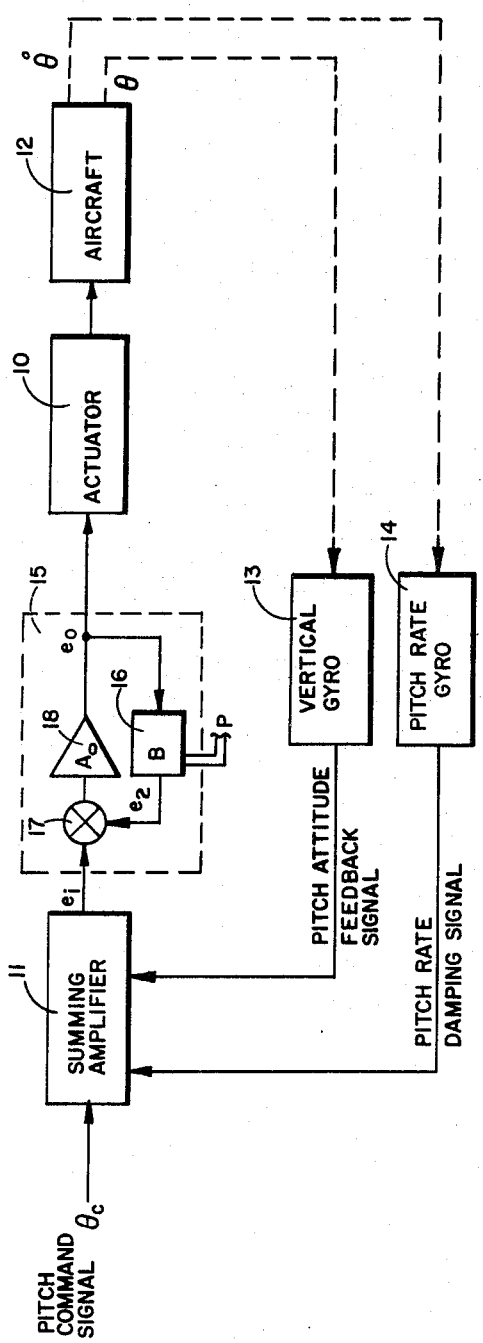
FIG. 1 is a schematic block diagram of a closed-loop device employing a concept of the invention.

Referring to FIG. 1, there is illustrated a block diagram of a flight control system embodying the concept of the invention. There is provided a conventional pitch attitude controller comprising an actuator 10 responsive to the output of a summing amplifier 11, and operatively arranged to cooperate with an aircraft 12 to control the pitching moments induced upon such vehicle. Amplifier 11 is adapted to be connected to a source of pitch command signals, $\theta_c$, and is responsively connected to a vertical gyro 13 or other source of negative feedback signals indicative of the pitch attitude of aircraft 12. There is further provided a pitch rate gyro 14 operatively connected to summing amplifier to provide a pitch rate damping signal to actuator 10. The construction and arrangement of elements 10, 11, 12, 13 and 14 are well-known to those skilled in the art, and are therefore shown in block form only.

Interposed between the output of summing amplifier 11 and the input to actuator 10 is a device 15 for scheduling the gain of the flight controller of FIG. 1 as an inverse function of air pressure. Such device 15 is comprised of a static pressure transducer 16, signal comparison means 17 responsively connected to the outputs of transducer 16 and amplifier 11 for providing a signal indicative of the difference therebetween. Pressure transducer 16 may be of any suitable type for providing a signal indicative of the amplitude of static or atmospheric pressure, and having a so-called infinite resolution A.-C. bridge type pick-off, as will be more particularly described hereinafter. There is further provided a high-gain amplifier 18 responsively connected to signal comparison means 17. The output of high-gain amplifier 18 is connected to actuator 10 and is further fed to pressure transducer 16 as a source of excitation therefor. If the sense of the excitation thus provided is selected to provide an output signal from sensor 16 having a sense opposite to that of the output from summing amplifier 11, then signal comparison means 17 may be comprised of a simple summing network.

In normal operation, combination 15 varies the gain of the output from summing amplifier 11 to actuator 10 as an inverse function of sensed static air pressure. However, the airframe gain (pitch response $\theta$ to a given actuator input signal) normally decreases with a decrease in static pressure. Hence, the combined effect of element 15 in cooperation with the system of FIG. 1 is to compensate for variations in airframe gain with pressure-altitude, whereby the static aerodynamic response characteristics of the vehicle are made more nearly constant over a wide-range of altitudes. Such a characteristic is also of value in the case of a manually-controlled aircraft, in that the handling characteristics appear more constant to the pilot, whereby less skill and pilot-training are required in order to satisfactorily control such vehicle.

That combination 15 provides a gain which varies inversely to the pressure sensed by transducer 16 may be appreciated from the following analytical description. Letting the ratio $e_0/e_1$, represent the gain characteristic of the signal input-output relationship of gain changer 15, such ratio or gain may be expressed in terms of the closed loop relationship between $e_0$ and $e_1$:

$$e_0 = (e_1 - e_2) A_0 \quad (1)$$

where:
$e_1$ = an input signal
$e_0$ = an associated output signal
$e_2$ = the output from transducer 16
$A_0$ = gain of amplifier 18

Recalling that the output from a pressure transducer is a function of its gain, the level (and sense) of excitation and the magnitude of the pressure sensed, and further recalling that the output $e_0$ from amplifier 18 comprises the excitation source for sensor 16:

$$e_2 = e_0 \beta P_s \quad (2)$$

where:
$\beta$ = the gain of transducer 16
$P_s$ = the magnitude of the sensed pressure Substituting Equation 2 into Equation 1:

$$e_0 = (e_1 - e_0 \beta P_s) A_0 \quad (3)$$

Solving for the gain or ratio $e_0/e_i$:

$$e_0 (1 + A_0 \beta P_s) = e_1 A_0 \quad (4)$$

$$\frac{e_0}{e_1} = \frac{A_0}{1 + A_0 \beta P_s} \quad (5)$$

Now if, within the pressure range of interest, the term $A_0 \beta P_s$ is made substantially greater than unity (say, by increasing the gain $A_0$ of amplifier 18), then:

$$\frac{e_0}{e_1} \approx \frac{K}{P_s} \text{ where } K = 1/\beta \quad (6)$$

Hence, it is to be seen that the device of FIG. 1 accomplishes gain scheduling of a flight control system as an inverse function of sensed static pressure or air density $\varphi$ without the use of either function generator type potentiometers or rotary electromechanical computer servos. It is to be appreciated, however, that sensor 16 could be adapted by means well-known in the art to sense differential pressure, whereby the device of FIG. 1 would accomplish such gain scheduling as an inverse function of $\tfrac{1}{2} \varphi V^2$.

It is to be further appreciated that pressure sensor 16 could be adapted to sense total pressure (e.g., static pressure plus impact or differential pressure) in order to schedule the flight controller gain as a function of at least the predominating pressure factor affecting the aircraft gain over the flight envelope or range of combinations of speed and altitude of an aircraft. Hence, at low speed —low altitude flight conditions ($V^2$ approaches zero and $\varphi$ approaches a maximum), gain scheduling is effected mainly as a function of pressure altitude; while at high speed, low altitude flight conditions ($V^2$ approaches a high number and $\varphi$ approaches zero), gain scheduling is effected mainly as a function of airspeed. In this way, the airframe gain or response in the control loop of FIG. 1 may be equalized over a wide range of flight conditions.

While the embodiment of FIG. 1 illustrates the concept of the invention as applied to the pitch loop controller of an aircraft, it is to be understood that the utility of the concept is not limited to an aircraft pitch attitude controller, but may be employed in any vehicle controller application wherein the gain or response of the controlled vehicle is a function of the parameter sensed by sensor 16.

Figure 2:
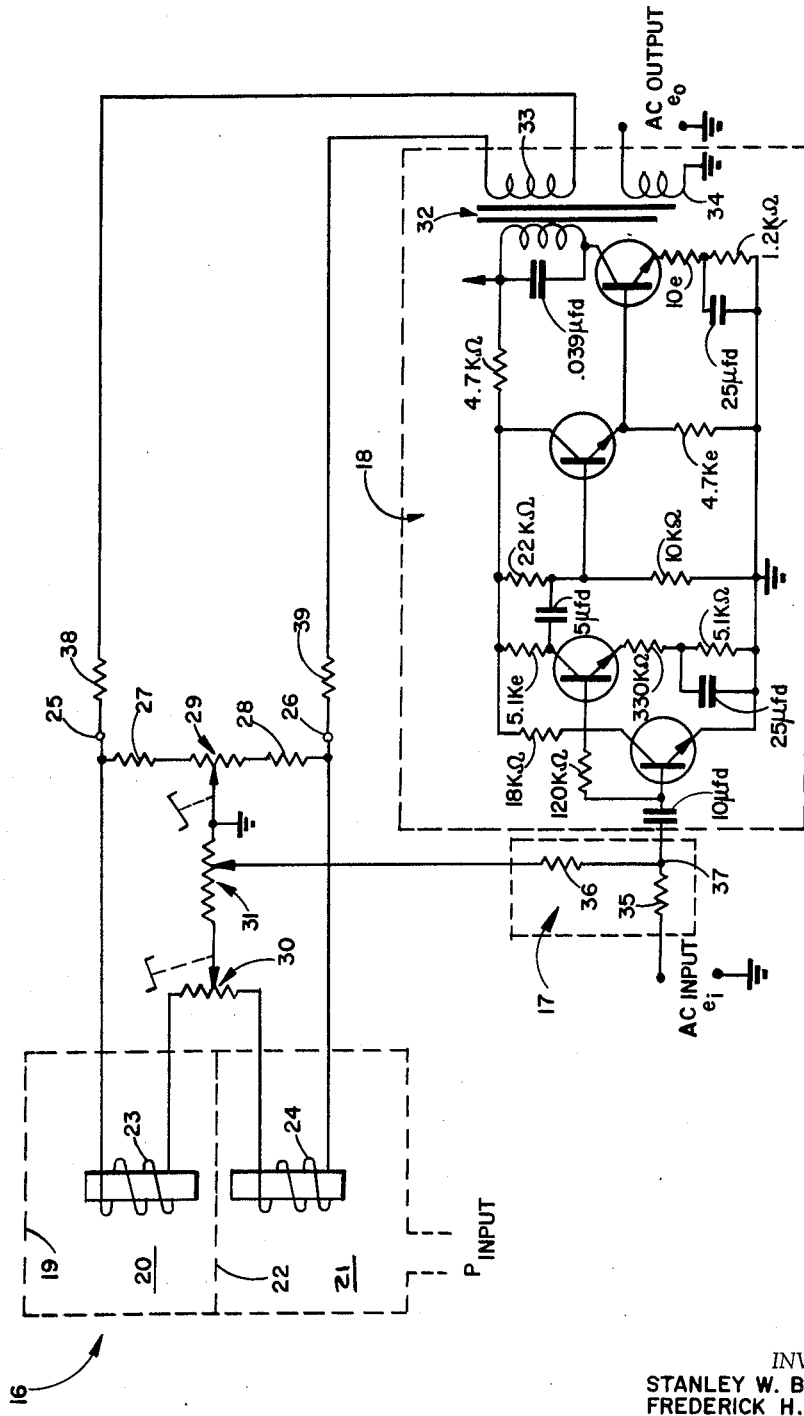
FIG. 2 is a circuit diagram of a preferred embodiment of the invention.

An exemplary mechanization of element 15 in FIG. 1 is shown in FIG. 2.

Referring to FIG. 2, there is illustrated an exemplary embodiment of gain scheduling element 15 of FIG. 1. There is provided a static pressure transducer 16, signal comparison means 17, and high-gain amplifier 18 all constructed and arranged to cooperate substantially the same as like-referenced elements in FIG. 1. Pressure transducer 16 may be constructed of a rigid vessel 19 sealingly divided into two chambers 20 and 21 by means of an elastic, pressure-sensitive magnetically permeable diaphragm 22, a first chamber 20 being evacuated and a second chamber 21 being ported to a source of static air pressure such that the deflection of the diaphragm, being sensitive to the pressure differential between the two chambers, will be indicative of the pressure in the second chamber 21. An E-type or A.-C. inductive pick-off is provided by means of a pair of inductive elements 23 and 24 mounted in proximity to diaphragm 22, whereby motion of diaphragm 22 varies the inductance of one inductive element relative to the other. Such transducer may be similar to Model S-3 manufactured by Ultradyne Corporation or Model AP-7-400 as manufactured by Northam Corporation. The two inductive elements are connected in series circuit across the excitation terminals 25 and 26 of a conventional A.-C. bridge circuit arrangement, the other two impedance elements of the bridge being mutually similar series resistors 27 and 28.

The two pick-off terminals for measuring unbalances in the bridge circuit are nominally the common connection between the two series connected inductance pick-off elements 23 and 24 and the common connection between the two series connected resistors 27 and 28. However, three manually adjustable potentiometers 29, 30 and 31 have been inserted in the bridge circuit for several reasons. Null potentiometer 29 has been inserted in series circuit between the two series resistors 27 and 28 to provide a null adjustment (e.g., adjust the value of sensed pressure for which no signal output occurs). This is done by varying the effective resistance in each resistive branch of the bridge circuit through adjustment of the position of the pick-off are on potentiometer 29. Quadrature potentiometer 30 has been inserted in series circuit between the two series inductive pick-off elements 23 and 24 to provide a quadrature adjustment (e.g., balance out any quadrature output signal component existing at a so-called null signal condition). This is done by varying the effective resistance in series with each reactive impedance branch of the bridge circuit through adjustment of the position of the pick-off arm on potentiometer 30.

The output signal or potential of the bridge circuit thus nominally appears across the potentiometer arms of potentiometers 29 and 30. A feedback gain adjustment potentiometer 31 is connected across the potentiometer arms of potentiometers 29 and 30 to provide a gain adjustment of the bridge signal output level, corresponding to the term $\beta$ in Equation 2.

One end of the resistive element of potentiometer 31 is grounded as shown to provide one terminal of a two-terminal output, the second output terminal being provided by the wiper arm of potentiometer 31. A gain adjustment or attenuation is effected by adjusting the position of the wiper arm of potentiometer 31.

Amplifier 18 is illustrated as four R-C coupled transistors, having a transformer coupled output, but may be of any type suitable as a high-gain A.-C. summing amplifier. However, the use of an output transformer 32 having two secondary windings 33 and 34 permits convenience in decoupling the A.-C. signal output from the D.-C. power supply, and in establishing the proper phasing or sense of the negative feedback connection from the output of amplifier 18 (e.g., winding 33) to excitation terminals 25 and 26 of the A.-C. bridge circuit without concern for the grounding connection employed in the intended use of the output signal (e.g., winding 34).

The input to summing amplifier 18 is effected by signal comparison means 17, comprising summing resistors 35 and 36. A terminal of each of resistors 35 and 36 is commonly connected to the input terminal 37 of amplifier 18, a second terminal of first summing resistor 35 being adapted to be connected to a source of an A.-C. signal. A second terminal of second summing resistor 36 is connected to the output or wiper arm of gain potentiometer 31. While the combination of elements 35 and 36 functions as a summing network, the result is that of a signal comparator, where the phase or sense of the excitation connection of bridge excitation terminals 25 and 26 to secondary winding 33 are so chosen as to obtain a feedback signal at summing resistor 36 having an opposite sense to the A.-C. input applied to summing resistor 35, which generates such feedback signal.

The effectiveness of the negative feedback device of FIG. 2, representing a concept of the invention, relies upon a substantially high gain for amplifier 18. However, closed-loop stability considerations may limit the maximum allowable gain. In other words, inherent phase shift characteristics of the amplifier and bridge circuit combination may become so pronounced at higher gains as to cause regenerative coupling or undesired oscillations in the signal output. Accordingly, a particular embodiment must include means for minimizing such phase shift. Such means is provided in the embodiment of FIG. 2 by swamping resistors 38 and 39 interposed in series circuit between excitation terminals 25 and 26 respectively and the output from amplifier 18. The effect of such resistors is to increase the resistive component of the effective feedback impedance, thereby reducing the phase shift contributed by reactive elements in the circuit, such as transformer 33 for example.

In many control system applications, it is desired to program the controller gain as a function of differential air pressure. Differential air pressure $P_d$ is the difference between ram air pressure $P_t$ and static or atmospheric air pressure, $P_s$, where ram air pressure is the total air pressure experienced by a vehicle moving through an airmass.

A transducer for sensing such differential pressure would resemble static pressure transducer 16 of FIG. 2, but with several differences. First chamber 20 would be ported to a source of static pressure rather than totally enclosed and evacuated, and second chamber 21 would be ported to a source of ram air pressure. Hence, the deflection of diaphragm 22 would be determined by the difference between the ram air pressure acting on one side of the diaphragm, and the static air pressure acting on the other, such that the resulting deflection would be indicative of the difference pressure $P_d$.

In many control system applications it is desired to determine the ratio of two parameters. For example, the ratio of differential air pressure to static or atmospheric air pressure is employed in computing mach number and the like. A signal indicative of the ratio $P_d/P_s$ may be conveniently generated by interposing a differential pressure transducer in series with a source of constant excitation and the device of FIG. 1, as illustrated in FIG. 3.

Figure 3:
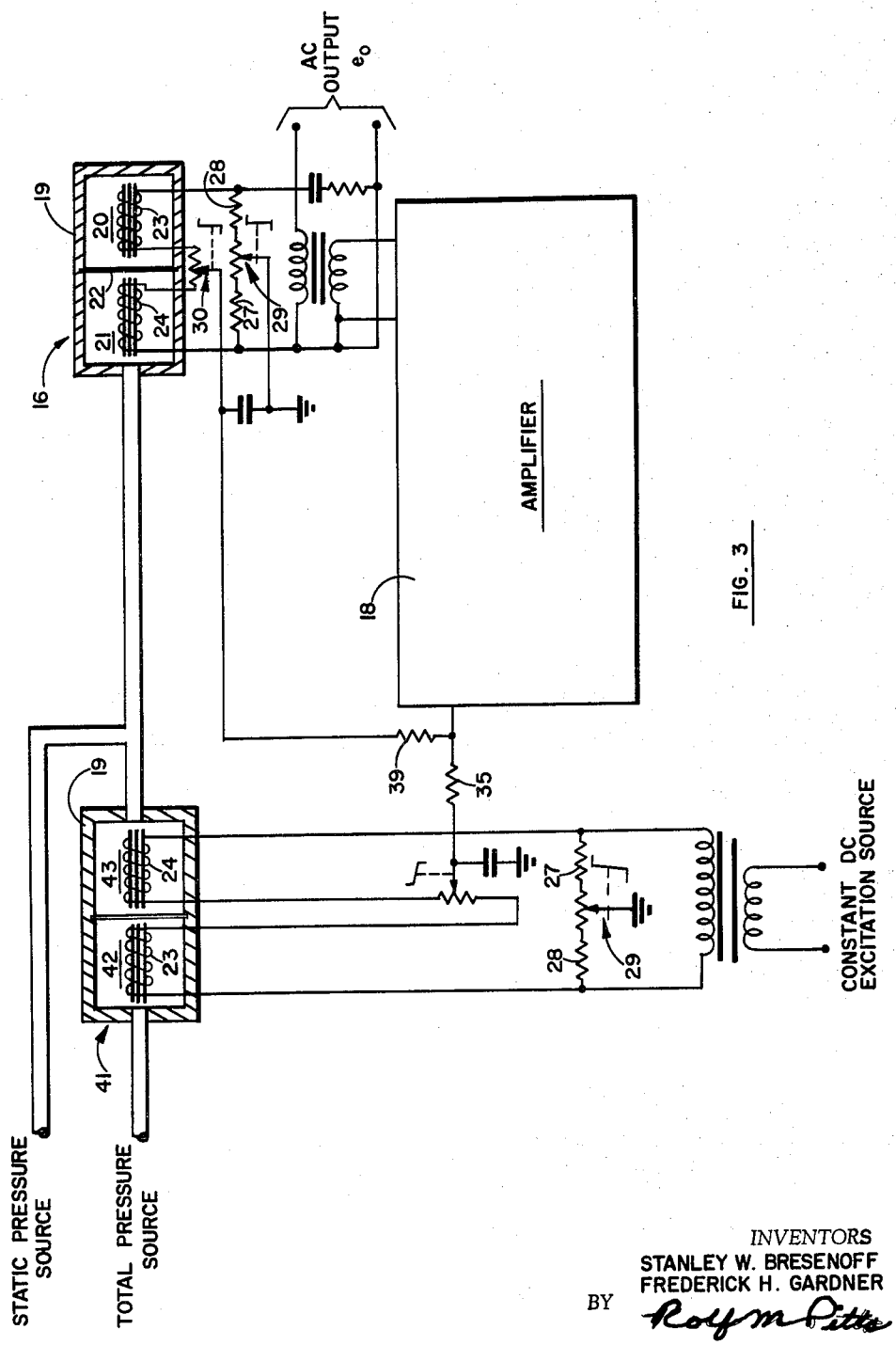
FIG. 3 is an exemplary schematic diagram partially in block of a pressure ratio signal generator.

Referring to FIG. 3, there is illustrated an exemplary schematic diagram, partially in block, of a pressure ratio signal generator. There is provided a static pressure transducer 16 cooperating with an A.-C. bridge, an A.-C. amplifier 18 with summing resistors 35 and 36, all similarly constructed and arranged as like referenced elements of FIG. 2. There is further provided a differential pressure transducer 41 having an A.-C. pick-off cooperating with an A.-C. bridge circuit. Differential pressure transducer 41 is similar in construction and arrangement to static pressure transducer 16 but for the porting of a first chamber 42 to a source of ram impact pressure rather than being evacuated. In this way, the impedance difference between the several reactive elements of the A.-C. pick-off of differential pressure transducer 41 is indicative of the pressure differential existing between the two chambers 42 and 43.

The A.-C. bridge circuit elements external to the differential pressure transducer are similar to those associated with static pressure transducer but for being operatively excited by an A.-C. source of fixed potential, rather than by the variable output of an amplifier of variable signals. Therefore, the signal output of transducer 41 is substantially indicative of only sensed differential pressure. The output of A.-C. bridge circuit is fed to first summing resistor 35.

That the device of FIG. 3 operates to provide a signal output indicative of the ratio of sensed differential pressure to static pressure $P_d/P_s$) is to be appreciated from the basic operation of the closed-loop device described by Equation 6, here repeated for convenience as Equation 7.

$$\frac{e_0}{e_i} = \frac{K_1}{P_s} \quad (7)$$

Recalling that the input $e_i$ to first summing resistor 35 is proportional to the differential pressure sensed by transducer 41:

$$e_i = K_2 P_d \quad (8)$$

Substituting Equation 8 in Equation 7 and solving for the output voltage, $e_0$:

$$e_0 = K_3 \frac{P_d}{P_s} \text{ where } K_3 = K_1 \times K_2 \quad (9)$$

Hence, it is to be appreciated that the device of FIG. 3 provides an output signal indicative of the ratio of two sensed parameters, without employing any mechanically moving parts other than the diaphragm of each of the two pressure transducers.

While the illustrated embodiments have been limited to transducers employing inductive type pick-off elements, it is to be understood that the device of the invention is not limited to inductive type pick-off elements, but may readily employ other types of pick-off elements such as, for example, capacitive elements. Nor is the device of the invention limited to the use of reactive impedances in the pick-off element, but may employ any form of impedance.

While the illustrated embodiments of the invention have been applied to sensed pressures, it is to be understood that the concepts of the invention are equally applicable to sensed temperatures or any parameter which may be sensed by means of a transducer employing an A.-C. bridge type pick-off arrangement.

Thus, the device of the present invention provides highly reliable electronic means for providing generating an output signal as a function of a sensed parameter.

Although the invention has been described and illustrated in detail, it is to be clearly understood that the same is by way of illustration and example only and is not to be taken by way of limitation, the spirit and scope of this invention being limited by the terms of the appended claims.

We claim:

1. A device for scheduling the gain of an electrical circuit as an inverse function of a sensed parameter comprising: a transducer having A.-C. pick-off element comprising a first and second mutually oppositely variable A.-C. impedance element; a bridge circuit comprising said variable impedance elements; an A.-C. amplifier having an input and output; a summing network comprised of a first and second summing impedance, one terminal of each said summing impedance being commonly connected to the input terminal of said amplifier, the other terminal of said first summing impedance being adapted to be connected to a source of a signal whose gain level is sought to be programmed, the other terminal of said second summing resistor being connected to the output of said bridge circuit; said bridge circuit being excited by the output of said amplifier terminals of said bridge circuit as to provide a negative feedback signal at said second summing resistor, and quadrature nulling means interposed between said A.-C. pick-off element and said output of said bridge comprising the resistive element of a resistive potentiometer interconnecting variable impedance elements, the wiper of said potentiometer being connected to said bridge output.

2. A device for scheduling the gain of an A.-C. electrical circuit as an inverse function of a sensed parameter comprising: a transducer having an A.-C. pick-off element comprising a first and second mutually oppositely variable reactance element; a bridge circuit having a first and second excitation terminal and first and second pick-off terminals; said first variable reactance element being connected across said first excitation terminal and said first pick-off terminals, and said second variable reactance element being connected across said second excitation terminal and said first pick-off terminal; a first bridge resistor connected across said first excitation terminal and said second pick-off terminal; a second bridge resistor connected across said second excitation terminal and said second pick-off terminal; an A.-C. amplifier having an input and an output; a summing network comprised of a first and second summing resistor, one terminal of each said resistor being commonly connected to the input terminal of said amplifier, the other terminal of said first summing resistor being adapted to be connected to a source of a signal whose gain level is sought to be programmed, the other terminal of said second summing resistor being connected to said first pick-off terminal of said bridge circuit; the output of said amplifier being connected across said excitation terminals of said bridge circuit as to provide a negative feedback signal at said second summing resistor; and phase shift minimizing means interposed in circuit with said output of said amplifier, said bridge circuit and said second summing resistor for reducing the phase shift associated with said negative feedback signal.

3. A device for generating a signal indicative of the ratio of two parameters comprising: a first A.-C. bridge network having a first transducer operatively connected to an A.-C. source of constant excitation for providing a signal indicative of a first sensed parameter; a high gain A.-C. summing amplifier for providing an output indicative of the sums of the inputs thereto; a second A.-C. bridge network having a second transducer operatively connected to the output of said summing amplifier for providing an output indicative of the product of a second sensed parameter having a single sense and the output of said amplifier; the input of said amplifier being responsive to the outputs of said first and second transducers; the sense of the output of said second transducer being selected to provide a negative feedback signal at the input to said amplifier; and phase-shift minimizing means interposed in circuit between the output of said amplifier and an excitation input of said second bridge network.

4. A device for generating a signal indicative of the ratio of two pressures comprising: a first A.-C. transducer operatively connected to a source of constant excitation for providing a signal indicative of a first sensed pressure; a high gain A.-C. summing amplifier for providing an output indicative of the sums of the inputs thereto; a second A.-C. transducer operatively connected to the output of said summing amplifier for providing an output indicative of the product of a second sensed pressure and the output of said amplifier; the input of said amplifier being responsive to the outputs of said first and second pressure transducers; the sense of the output of said second pressure transducer being selected to provide a negative feedback signal at the input to said amplifier, and swamping resistors interposed in series circuit between said second A.-C. transducer and the input of said A.-C. amplifier.

5. A pitch attitude flight control system for an aircraft, including means for minimizing the variation of aircraft pitching moment response to an electrical control signal with variations in flight condition, comprising: an amplifier having an input and an output for processing said electrical control signal; a pressure transducer having a pick-off element for providing an output signal indicative of a sensed pressure; comparison means responsive to said control signal and the output of said transducer for providing a signal indicative of the difference therebetween; the input of said amplifier being responsively connected to said comparison means, and the pick-off element of said transducer being electrically excited by the output of said amplifier.

6. A pitch attitude flight control system including means for varying the gain thereof oppositely as the aircraft moment response varies in response to changes in flight condition, comprising means for generating an A.-C. electrical pitch control signal;

an A.-C. summing amplifier having an input and output for processing said pitch control signal;

an air pressure transducer having a bridge circuit type A.-C. pick-off including A.-C. excitation means, said summing amplifier being responsive to said control signal and the output of said pick-off, and said excitation means being responsively connected to the output of said amplifier in such sense that the output of said pick-off fed to said summing amplifier comprises negative feedback means; and resistive impedance means interposed in series circuit between said excitation means and the output of said summing amplifier for minimizing phase-shift therebetween.

References Cited by the Examiner

UNITED STATES PATENTS

| 2,546,156 | 3/1951 | Harris | 328—1 |
| 2,979,955 | 4/1961 | Shepler | 73—398 |
| 3,015,074 | 12/1961 | Taskett | 330—9 |

DAVID J. GALVIN, *Primary Examiner.*